United States Patent
Möster et al.

(10) Patent No.: US 6,445,429 B1
(45) Date of Patent: Sep. 3, 2002

(54) METHOD FOR ASSEMBLING A LIQUID CRYSTAL DISPLAY PANEL IN A MOBILE TELEPHONE

(75) Inventors: Erik Möster; Paul Larsson; Mats Olsson, all of Malmö ; Olof Simonsson, Lund; Mats Larsson; Rafael Portela, both of Malmö, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/431,995

(22) Filed: Nov. 2, 1999

(51) Int. Cl.[7] .................... G02F 1/1333; G02F 1/1345
(52) U.S. Cl. .................... 349/58; 349/150; 345/905
(58) Field of Search .................... 349/58, 122, 150; 345/905; 361/683, 730; 312/223.1, 223.2

(56) References Cited

U.S. PATENT DOCUMENTS

| | | | |
|---|---|---|---|
| 5,358,412 A | 10/1994 | Maurinus et al. | 439/66 |
| 5,675,397 A | 10/1997 | Fukushima | 349/149 |
| 5,677,748 A * | 10/1997 | Tadokoro | 349/152 |
| 5,905,551 A * | 5/1999 | Sanpei et al. | 349/60 |
| 6,229,695 B1 * | 5/2001 | Moon | 361/683 |

FOREIGN PATENT DOCUMENTS

| | | |
|---|---|---|
| DE | 299 09 079 U 1 | 7/1999 |
| EP | 0735404 A1 | 10/1996 |
| EP | 0 789 473 A2 | 8/1997 |
| EP | 0 936 789 A1 | 8/1999 |
| EP | 0 951 161 A1 | 10/1999 |
| EP | RS103986 US | 4/2000 |
| JP | 01 237685 A | 9/1989 |
| JP | 08354082 | 6/1998 |
| JP | 10 215085 A | 8/1998 |
| WO | WO97 33417 A | 9/1997 |

* cited by examiner

Primary Examiner—William L. Sikes
Assistant Examiner—Tarifur R. Chowdhury
(74) Attorney, Agent, or Firm—Jenkens & Gilchrist, P.C.

(57) ABSTRACT

A liquid crystal display panel in a mobile telephone is directly mounted to either a printed circuit board or a frame portion of a mobile telecommunication instrument, e.g., a telephone. An angular mounting structure for the liquid crystal display panel has a pair of support ribs that extend outwardly from a substantially planar portion of a frame, or back cover, of a telephone. Thus, the need for additional mounting parts is obviated. In one embodiment, the liquid crystal display panel is biasedly received within recesses provided on distal ends of support ribs extending from the frame portion. Preferably, the distal ends of the ribs have distal end surfaces which are adapted to fixedly support the liquid crystal display panel in predefined nonparallel relationship with respect to the planar portion of the back cover, with the aid of an adhesive material, e.g., a two sided adhesive tape. A method of assembly for mounting the liquid crystal display using the two sided adhesive tape is disclosed.

11 Claims, 2 Drawing Sheets

METHOD FOR ASSEMBLING A LIQUID CRYSTAL DISPLAY PANEL IN A MOBILE TELEPHONE

BACKGROUND OF THE INVENTION

1. Technical Field

This invention relates generally to a method for mounting a liquid crystal display panel in a mobile telecommunication instrument, and more particularly to such a method that is directed to facilitating automated assembly of a liquid crystal display panel in a mobile telecommunication instrument.

2. Background Art

It is desirable, in many mobile telecommunication instruments, such as cellular. telephones and similar devices, to have a liquid crystal display (LCD) panel which displays important data necessary to the operation of the instrument. A basic problem in assembling an LCD panel, in a mobile telephone instrument is the need to use additional mechanical components to secure the LCD panel in its desired position.

The additional components and the increased number of assembly operations required heretofore increases the overall cost of the instrument. For example, European Patent Office publication EP0735404A1, published Oct. 2, 1996 for *Liquid Crystal Display, Its Mounting Structure, And Electronic Device* discloses a horizontally mounted LCD panel. In this arrangement, additional components are needed to fixedly mount the panel in the instrument. The disclosed mounting arrangement requires an attachment fixture having feet that protrude through holes in a printed circuit board, which during assembly are bent, thereby forcedly pressing the LCD and a subjacently disposed light guide together, thereby fixing the LCD and light guide in place. The attachment fixture requires reinforcement ribs to prevent flexing under the applied pressure, and compliant cushions between the ribs and the LCD panel and between the light guide and the printed circuit board. Thus, the disclosed structure, typical of LCD panel mounting structures in common use, requires a significant number of parts, along with multiple assembly steps.

The present invention is directed to overcoming the problems described above. It is desirable to have a method for enabling automatic assembly of a LCD panel in a mobile telecommunication instrument, such as a mobile telephone. It is also desirable to have such a method that does not require additional mechanical components to fixedly mount the LCD panel in the instrument, either horizontally or in angled relationship with respect to the instrument case, and additionally is readily adaptable to vertical-assembly automatic assembly processes.

SUMMARY OF THE INVENTION

In accordance with one aspect of the present invention, a method for assembling a liquid crystal display panel in a mobile telecommunication instrument having a frame and a printed circuit board disposed in the frame, includes providing a liquid crystal display panel, providing a means for attaching the liquid crystal display panel directly to a predetermined one of the frame and the printed circuit board, and then attaching the liquid crystal display panel directly to the predetermined one of the frame and the printed circuit board.

Other features of the method for assembling a liquid crystal display panel in a mobile telephone, in accordance with the present invention, include the step of providing a means for attaching the liquid crystal display panel directly to a predetermined one of the frame and the printed circuit board by providing a tape having adhesive material deposited on both sides of the tape. Other features of the method include one side of the tape being preattached to a bottom surface of the LCD and the other side of the tape having a protective film deposited thereon, the protective film being removed from the tape prior to attaching the tape to the predetermined one of the frame and the printed circuit board. Additional features include providing a liquid crystal display panel having a flexible conductor extending from the liquid crystal display panel to a connector.

Additional features of the method for assembling a liquid crystal display panel in a mobile telecommunication instrument, wherein the frame of the mobile telecommunication instrument has a substantially planar portion and at least two support ribs extending outwardly from the planar portion and integrally formed with the frame, with each of the support ribs having a distal end that is spaced from the planar portion of the frame and adapted to support a portion of the liquid crystal display panel, includes attaching the liquid crystal display panel to the distal ends of the ribs. Other features of the method include adhesively attaching the liquid crystal display panel to the support ribs, either by an adhesive material or with a tape having adhesive material deposit on both sides of the tape. Still additional features include the distal ends of the support ribs each having a recess adapted to biasedly receive a respective portion of the liquid crystal display panel therein, and attaching of the liquid crystal display panel includes inserting portions of the liquid crystal display panel into the recesses.

Still other features of the method for assembling a liquid crystal display panel in a mobile telecommunication instrument, in accordance with the present invention, include the distal ends of the support ribs being disposed in non-parallel relationship with the substantially planar portion of the frame and the attachment of the liquid crystal display panel on the distal ends of the support ribs includes the liquid crystal display panel being disposed in non-parallel relationship with the substantially planar portion of the frame. Another feature includes the frame being the back cover of a mobile telecommunication instrument, such as a cellular telephone.

In another aspect of the present invention, a telecommunication instrument comprises a frame, a printed circuit board, and a liquid crystal display panel directly mounted to a predetermined one of the frame and the printed circuit board.

Other features of the telecommunication instrument embodying the present invention include the liquid crystal display panel being adhesively attached to the printed circuit board, such as by a tape having adhesive material disposed on both sides of the tape. Additional features include the liquid crystal display panel being adhesively mounted to the frame, such as with double-sided adhesive tape. Still additional features include the frame having a substantially planar portion and at least two support ribs extending outwardly from the planar portion. Each of the support ribs have a distal end adapted to fixedly support the liquid crystal display panel. An additional feature includes the distal ends of the support ribs being disposed in non-parallel relationship with the planar portion of the frame. Still another feature includes the distal ends of the support ribs each having a recess adapted to biasedly receive a respective portion of the liquid crystal display panel therein.

In accordance with yet another aspect of the present invention, a back cover for a telecommunication instrument has a substantially planar portion and at least two support ribs extending outwardly from the planar portion and at least two support ribs extending outwardly from the planar portion and integrally formed with the planar portion. Each of the support ribs have a distal end, spaced from the planar portion of the back cover, which is adapted to fixedly support a liquid crystal display panel thereon in oblique, or angled, relationship with the planar portion of the back cover.

Other features of the back cover for a telecommunication instrument embodying the present invention include the distal ends of the support ribs having a flat surface adapted to receive an adhesive material whereby the liquid crystal display panel is adhesively fixed to the distal respective end of the ribs. Additional features include the adhesive material being double-sided adhesive tape. Still additional features include each of the distal ends of the outwardly extending ribs having a recess provided therein that is adapted to biasedly receive a portion of the liquid crystal display panel therein.

BRIEF DESCRIPTION OF THE DRAWINGS

A more complete understanding of the structure and assembly operations of the present invention may be had by reference to the following detailed description when taken in conjunction with the accompanying drawings, wherein.

DETAILED DESCRIPTION OF PRESENTLY PREFERRED EXEMPLARY EMBODIMENTS

As discussed above in the Background Art, prior methods for mounting a liquid crystal display (LCD) panel in a telecommunication instrument, such as a cellular phone, require that the LCD be inserted into a retaining fixture, usually along with a light guide or carrier, and then the assembly is mechanically, or adhesively, attached to a printed circuit board (PCB). The prior methods not only require additional components or parts, but also require additional assembly steps, which increase the cost of the produced instrument and frequently renders the structure unsuitable for automated assembly.

Figure 1:
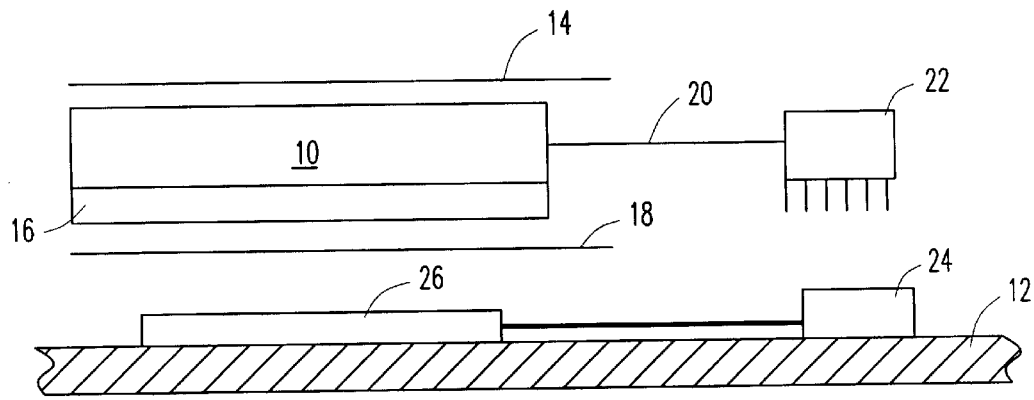
FIG. 1 is a schematic representation of one embodiment of the method for assembling a liquid crystal display panel in a mobile telecommunication instrument, in accordance with the present invention.
Figure 2:
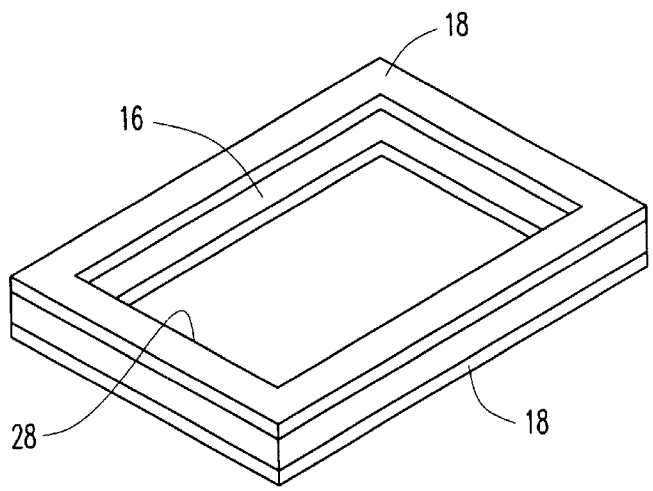
FIG. 2 is a three-dimensional view of a preformed double-sided adhesive pad employed in the method illustrated in FIG. 1.

A first preferred embodiment of a method for assembling a liquid crystal display panel in a mobile telecommunication instrument, such as a cellular telephone, is described with reference to FIGS. 1 and 2. In this embodiment, a liquid crystal display panel 10 is provided for attachment to a printed circuit board 12. Desirably, the LCD panel 10 has a protective film 14 covering an upper portion of the LCD panel 10 to protect the upper surface during shipping, handling, and assembly. The lower surface of the LCD panel 10 has a preformed pad, or tape, 16 as illustrated in FIG. 2, which has an adhesive material deposited on both sides of the tape 16. The adhesive material on each side is protected, during shipping and handling, by a protective film 18. As illustrated in FIG. 1, the protective film is removed from one side of the preshaped pad, or tape, 16 and the exposed side of the tape 16 is attached to the lower surface of the liquid crystal display panel 10. The lower protective film 18 is removed just prior to adhesively attaching the preassembled liquid crystal display panel 10 and adhesively attached tape 16 to the printed circuit board 12.

The liquid crystal display panel 10 has a flexible conductor 20 providing electrical connection between the liquid crystal display panel and a connector 22 at the distal end of the flexible conductor 20. After attachment of the liquid crystal display panel 10 to the printed circuit board 12, the connector 22 attached to the flexible conductor 20 is inserted into a mating connector 24 attached to the secondary surface of the printed circuit board 12, thereby providing an electrical connection between the liquid crystal display panel 10 and LCD drive circuits on the printed circuit board 12.

Back light illumination of the liquid crystal display panel 10 is provided by an electroluminescent panel, or lamp, 26 pre-attached to the printed circuit board 12. The pre-shaped tape 16 has a central opening 28 to permit transmission of light from the electroluminescent panel 26 to the liquid crystal display panel 10 after assembly of the LCD 10 to the PCB 12.

Alternatively, the preformed pad, or tape, 16 could be pre-attached to the printed circuit board 12 and the liquid crystal display panel then attached to the PCB 12 by adhesion to the pre-deposited tape 16. Also, instead of a pre-formed pad, or tape, a suitable adhesive material could be pre-deposited on either the bottom surface of the liquid crystal display panel 10 or the secondary surface of the printed circuit board 12 immediately prior to joining the LCD panel to the PCB. In either of the above-described assembly arrangements, it can be easily recognized that the assembly is relatively simple and straight forward, assembly being in the vertical direction only, enabling all operations to be accomplished by automated assembly methods, such as robots or computer-controlled assembly fixtures. The flexible conductor 20 with mating connectors 22, 24 provide a rigid electrical connection between the LCD panel 10 and the PCB 12. Moreover, the double-sticking adhesive pad, or tape 16 advantageously absorbs pressure and mechanical shock and reduces the possibility of damage to the LCD panel 10.

Figure 3:
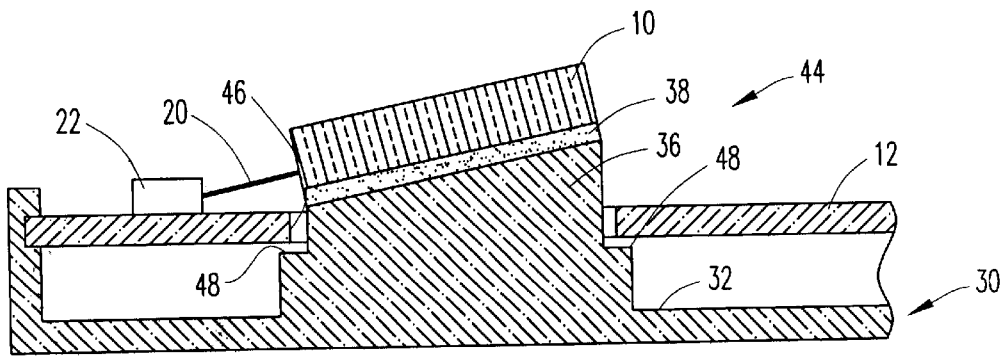
FIG. 3 is a cross-sectional view of another embodiment of a method, embodying the present invention, for assembling a liquid crystal display panel in a mobile telecommunication instrument.
Figure 4:
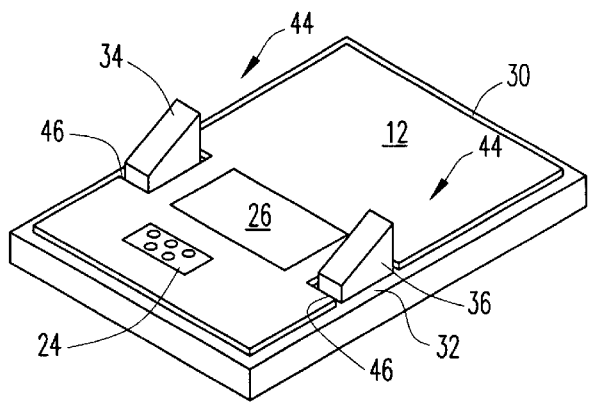
FIG. 4 is a three-dimensional view of a first embodiment of an angular mounting structure for a liquid crystal display panel, embodying the present invention.
Figure 5:
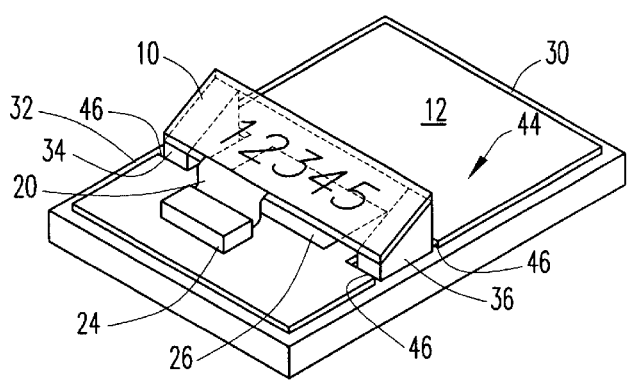
FIG. 5 is a three-dimensional view of the angular mounting structure illustrated in FIG. 4, showing the liquid crystal display panel mounted on the angular mounting structure in accordance with the present invention.
Figure 6:
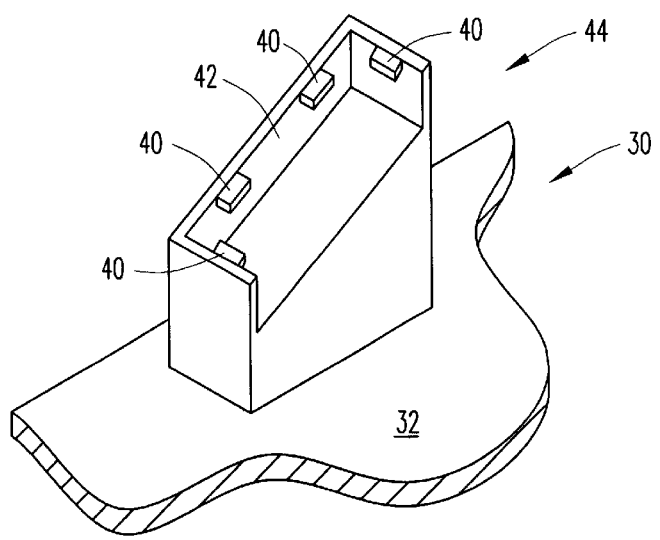
FIG. 6 is a three-dimensional view of another embodiment of the support structure embodying the present invention, in which the liquid crystal display panel support ribs have a recess adapted to receive a respective portion of the liquid crystal display panel therein.

In another embodiment of the method for assembling a liquid crystal display panel in a mobile telecommunication instrument, the telecommunication instrument includes a frame 30, as illustrated, in various arrangements, in FIGS. 3–6. In each of these arrangements, the frame 30 has a substantially planar portion 32. As described below in greater detail, the frame 30 may comprise the back cover of a telecommunication instrument, such as a cellular telephone, and the terms "the frame" and "back cover" to describe the component 32 is therefore used interchangeably herein. The frame, or back cover, 32 in each of the arrangements, has at least two support ribs 34, 36 (only one of which is shown in FIGS. 3 and 6), extending outwardly from the planar portion of 32 and are intricately formed, e.g. molded, with the back cover 30. In each of the illustrated arrangements, the LCD panel 10 is mounted to a distal end of the support ribs 34, 36. In FIGS. 3–5, the LCD panel 10 is adhesively mounted on the distal end of the support ribs 34, 36, such as by a double sided tape 38 or a similar adhesive material.

In yet another arrangement, illustrated in FIG. 6, the distal end of each of the support ribs 34, 36 has a plurality of tabs 40 which extend inwardly from a recess 42 which provide a snap-fit feature whereby the LCD panel 10 can be mechanically attached to the support ribs 34, 36 of the frame 30 without the use of adhesives of double-sided tape. As described below in greater detail, the tabs 40 desirably have a tapered upper surface to aid in assembly by insertion of the LCD panel 10 into the recess 42. The recesses 42 and the tabs 40 are desirably formed so that they provide a slight interference fit between the installed LCD panel 10 and the support recesses 42. The slight interference fit provides biased support for the liquid crystal display panel 10 preventing movement between the LCD panel 10 and the support rib 46.

In another aspect of the present invention, an angular mounting structure for a liquid crystal display panel is generally indicated by the reference number 44 in FIGS. 3–6. In these arrangements, the angular mounting structure 44 comprises the frame 30 having the generally planar portion 32. Desirably, as mentioned above, the frame 30 may comprise the back cover of a telecommunication instrument, for example a mobile telecommunication instrument such as a cellular telephone. In such instances the terms "frame" and "back cover" to describe the component 30 are used interchangeably in the following description. It should also be understood that the "frame" may be a separate structure on which the primary operating and electrical components of the instrument are mounted, with the outer case being a cosmetic covering assembled over the frame. As shown in FIGS. 4 and 5, the substantially planar portion 32 is the inner surface of a back cover 30 of a telecommunication instrument and, accordingly, may be somewhat curved to confirm to the general contour of the back cover 30. Thus, the term "substantially planar portion" does not necessarily mean a perfectly flat surface extending over a considerable distance, but a surface that may be flat or a surface that may have some curvature. Typically, the back cover of mobile telephone communications is formed of a molded plastic material.

Importantly, the frame, or back cover 30, embodying one aspect of the present invention, has at least two support ribs 34, 36 extending outwardly from the planar portion 32 that are integrally formed, e.g., molded, with the back cover 30. In the first exemplary arrangement support ribs 34, 36 respectively have a distal end that is adapted to receive an adhesive material, such as double-sided tape thereon, whereby bottom portions disposed at opposite ends of the LCD panel 10 are adhesively fixed to the distal ends of the support ribs 34, 36, as illustrated in FIG. 5. Advantageously, in this arrangement the distal ends of the support ribs 34, 36 are flat surfaces disposed at a predetermined oblique, i.e., non-parallel, angle with respect to the planar portion 32 of the frame 30. The predetermined angle is such that the LCD panel 10 is disposed in non-parallel relationship with the face of a telecommunication instrument, not shown, when the top cover of the instrument is assembled to the back cover 30. The angular orientation, which typically may range from about 5° to about 15° generally provides improved viewing of the characters and symbols displayed on the panel.

As is well known, when used in telecommunication instruments, LCD panels are generally backlighted, for example with electroluminescent lamps, or light-emitting diodes, either directly or through light guides. As illustrated in FIGS. 1, 4 and 5 an electroluminescent panel 26 may be disposed directly on the printed circuit board 12. Alternatively, the backlight source may be preassembled directly to the back surface of the LCD panel 10, for example by the preshaped double-sided adhesive tape 16, and the LCD panel-backlight assembled as a single unit to the PCB 12 or support ribs 34, 36 as described above, with electrical connections for both components being made by the flexible cable 20.

In the arrangement illustrated in FIGS. 4 and 5, the printed circuit board 12 has reliefs 46 provided on opposite edges of the board 12 to permit passage of the support ribs 34, 36 through the PCB 12. Alternatively, the reliefs 46 may comprise apertures which extend through intermediate portions of the printed circuit board 12. Desirably, the printed circuit board 12 includes a plurality of pin sockets 24 adapted to receive the pin plug 22 provided on one end of the electrically conductive flexible film or cable 20. The opposite end of the flexible cable 20 is attached to the LCD panel 10, thereby providing electrical communication between LCD drive circuits incorporated on the PCB 12 and the LCD panel 10. Importantly, as described above, the flexible electrical interconnection between the LCD panel 10 and associated electrical circuits on the PCB 12 permits the LCD panel 10 to be physically attached to the PCB 12 frame 30 of the telecommunication instrument in a single assembly operation, and then the electrical connection completed by simple vertical insertion of the pin plug 22 into the sockets 24. Both of these operations can be accomplished automatically, thereby enabling the assembly of the angled LCD panel 10 to be easily carried out by automated assembly processes.

In another aspect of the present invention, illustrated in FIG. 3, the angular mounting structure has a somewhat modified support ribs 34, 36. In this arrangement, the support ribs, one of which (rib 36) is shown in FIG. 3, has an intermediate step 48 disposed between the planar surface 32 of the frame 30 and a distal end of the support rib 36. The stepped portion 48 provides spaced support for the printed circuit board 12 whereby the PCB 12 is spaced from the planar portion 32 of the back cover 30. As in earlier described the liquid crystal display panel 10 is adhesively attached to the distal end of the support ribs 34, 36 by a double-faced pad or tape 38. Also illustrated in FIG. 3, is the electrical connection between the LCD panel 10 and the printed circuit board 12, provided by the flexible cable 20 and the pin plug 22.

In another arrangement illustrated in FIG. 6, the support ribs 34, 36 are adapted to biasedly receive a portion of an LCD panel 10. It should be understood that, although FIGS. 3 and 6 illustrate only a single support rib, that at least two support ribs are typically required to adequately support an LCD panel 10 mounted thereon. Also, it should be understood that while in the embodiments described and illustrated herein, only two support ribs 34, 36 are described, additional ribs extending outwardly from the back cover, or frame, 30 may be used if additional support of the LCD panel is desired.

With specific reference to FIG. 6, in the third exemplary arrangement of an angular support structure 44 embodying the present invention, the distal end of the support rib 34 has a plurality of tabs 40 which extend inwardly from a recess 42 which provides a snap-fit feature whereby the liquid crystal display panel can be mechanically attached to the support rib 34 without the use of adhesives or double-sided tape. Desirably, the tabs 40 have a tapered upper surface to aid in assembly, or insertion, of the LCD panel in the recess 42. Also, the recess 42 and tabs 40 are desirably formed so that they provide a slight interference fit between the installed LCD panel and the support recess 42. The slight interference fit provides biased support for the liquid crystal display panel 10, preventing movement between the LCD panel 10 and the support ribs 34, 36.

INDUSTRIAL APPLICABILITY

The method for assembling a liquid crystal display panel 10 in a mobile telecommunication instrument, embodying the present invention, effectively addresses the problem of high volume production of mobile telephones without adding additional components or difficult to carry-out assembly steps, by directly attaching the LCD 10 to either a printed circuit board 12 or portion of the frame 30 of the instrument, in a vertical direction. The assembly method embodying the present invention, is cost effective and time efficient. Moreover the assembly procedure can easily be carried out automatically.

The angular mounting structure 44 for a liquid crystal display panel 10, embodying another aspect of the present invention, is particularly applicable to mobile telecommunications instruments, such as cellular telephones. The angular mounting structure 44 provides an easy and effective arrangement for attaching a liquid crystal display panel 10 by mechanical or adhesive means. Importantly, the angular mounting structure 44 described herein does not require additional parts over instruments having horizontally positioned LCDs. Prior structures for angular LCD positioning within portable telecommunication instruments require an increased number of parts and assembly steps. For these reasons, the angular mounting structure 44 embodying the present invention advantageously provides cost-effectiveness and time-efficiency in the production of telecommunication instruments in which the LCD panel 10 is mounted at a non-parallel angle with respect to the outer case of the instrument.

Although the present invention is described in terms of illustrated exemplary. embodiments, those skilled in the art will recognize that changes may be made without departing from the spirit of the invention. For example, the support ribs may have a shape other than the rectangular shape illustrated in the preferred exemplary embodiments, such as square, circular, oval, or L-shaped. Such changes are intended to fall within the scope of the following claims. Other aspects, features, and advantages of the present invention may be obtained from a study of this disclosure and the drawings, along with the appended claims.

What we claim is:

1. A mobile telecommunication instrument, comprising:
   a frame;
   a printed circuit board; and
   a liquid crystal display panel directly mounted to a predetermined one of said frame and said printed circuit board, wherein said frame has a substantially planar portion and at least two support ribs extending outwardly from said planar portion and integrally formed therewith, each of said support ribs having a distal end surface which is inclined to said planar portion of the frame and adapted to fixedly support the liquid crystal display panel thereon in predefined non-parallel relationship with the planar portion of the frame.

2. The mobile telecommunication instrument, as set forth in claim 1, wherein said liquid crystal display panel is adhesively attached to the printed circuit board.

3. The mobile telecommunication instrument, as set forth in claim 2, wherein the mobile telecommunication instrument includes a double-sided tape having an adhesive material disposed on both sides of the tape, and said tape is disposed between the liquid crystal display panel and the printed circuit board.

4. The mobile telecommunication instrument, as set forth in claim 1, wherein the liquid crystal display panel is adhesively mounted to a portion of said frame.

5. The mobile telecommunication instrument, is set forth in claim 4, wherein said mobile telecommunication instrument includes a double-sided tape having an adhesive material disposed on both sides of the tape, and said tape is disposed between the liquid crystal display panel and said portion of the frame.

6. The mobile telecommunication instrument, as set forth in claim 1, wherein said distal end surfaces of the support ribs are coplanar and receive an adhesive material whereby spaced apart portions of the liquid crystal display panel are adhesively fixed to the respective distal end surfaces of the support ribs.

7. The mobile telecommunication instrument, as set forth in claim 6, wherein said adhesive material is double-sided adhesive tape.

8. The mobile telecommunication instrument, as set forth in claim 1, wherein said distal ends of the support ribs each have a recess adapted to biasedly receive a respective portion of said liquid crystal display panel therein.

9. A back cover for a mobile telecommunication instrument comprising:
   a planar portion and at least two support ribs extending outwardly from said planar portion and integrally formed therewith, said support ribs having distal end surfaces which form an inclined mounting surface which is inclined to said planar portion of the back cover, said inclined mounting surface being adapted to fixedly support a liquid crystal display panel thereon in predefined non-parallel relationship with the planar portion of said back cover.

10. The back cover for a telecommunication instrument, as set forth in claim 9, wherein the distal end surfaces of the support ribs have coplanar flat surfaces adapted to receive an adhesive material whereby spaced apart portions of said liquid crystal display panel are adhesively fixed to distal end surfaces of said ribs.

11. The back cover for a telecommunication instrument, as set forth in claim 10, wherein said adhesive material is double-sided adhesive tape.

\* \* \* \* \*